June 19, 1962 D. M. KRAUSS 3,040,274

BALANCED MODULATOR

Filed Dec. 28, 1959 3 Sheets-Sheet 1

INVENTOR.
DONALD M. KRAUSS

BY Joseph P. Kates

ATTORNEY

*INVENTOR.*
DONALD M. KRAUSS
*BY* Joseph P. Kates
ATTORNEY

June 19, 1962 D. M. KRAUSS 3,040,274

BALANCED MODULATOR

Filed Dec. 28, 1959 3 Sheets-Sheet 3

INVENTOR.
DONALD M. KRAUSS
BY Joseph P. Kates
ATTORNEY 3,040,274

BALANCED MODULATOR

Donald M. Krauss, North Syracuse, N.Y., assignor to General Electric Company, a corporation of New York Filed Dec. 28, 1959, Ser. No. 862,120
11 Claims. (Cl. 332—48)

Figure 2A:
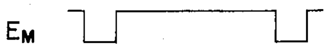

The present invention refers to a modulator and more particularly refers to a singly balanced modulator capable of providing an ideal output signal which comprises a relatively pure amplitude modulated carrier wave and sidebands free from the fundamental input modulating frequencies. The method and apparatus of the present invention is capable of presenting such output with appreciably complete suppression of components of modulating frequency even where highly complex, non-sinusoidal modulating waveforms have been applied. In this invention the modulating function is effected without loss of gain for the output carrier and sidebands.

Prior art singly balanced modulators, particularly where modulation was on a carrier of relatively low frequency compared with the modulating signal, were deficient in that balance was not adequate and the output contained a remaining small but significant amount of the modulating waveform at least. In prior art systems where extended low frequency response was involved, presence of even a small amount of modulation signal in the output caused difficulty in recovery of modulating information.

The present invention overcomes these and other deficiencies of the prior art and provides a singly balanced modulator of novel configuration and a method of modulation wherein a high degree of rejection of fundamental modulating frequencies occurs in the output; a high precision balance is maintained for extended periods of time; the invention performs its function in the presence of highly complex non-sinusoidal modulating waveforms without loss of gain for the carrier and sidebands; and filtering problems are avoided. The problems which the invention overcomes are particularly severe when highly complex waveforms are used to modulate low frequency carriers. The present invention also possesses the advantage that gain of the system for the carrier is not reduced even though a high degree of degeneration may exist for the unbalance signal. The inventive apparatus has the advantage of simplicity of construction and in particular employs simple commercially practical filters.

The present invention has particular applicability for uses such as where a modulating signal is relatively large with respect to the carrier signal or is an appreciable proportion of the frequency of the carrier signal and where it is desirable or necessary to suppress the modulating signal substantially completely. In such case a system could be designed using very complex filters to separate modulating frequency (or frequencies) from carrier and sideband (or side) frequencies which filters would require precision in manufacture. However, the present inventions is advantageous over such a system in that the filters utilized in the inventive apparatus are relatively simple integrating filters which are readily commerically available. The inventive circuit with its use of simple filters gives a higher degree of suppression than even complex types of filters might give in other circuits. Even with complex filters, other conceivable circuits could not perform suppression as acceptably as the present circuit can using simple filters.

Accordingly, an object of the present invention is to provide a singly balanced modulator which will insure a high degree of rejection of fundamental modulating frequencies in the output.

Another purpose of the present invention is to provide a modulator for providing a relatively pure output of carrier plus sideband signals while rejecting fundamental modulating frequencies when complex, non-sinusoidal modulating waveforms are utilized.

Another aim of the present invention is to provide a singly balanced modulator for carrier and sideband output with relatively complete rejection of modulating frequency in the output by maintaining high precision balance for extended periods of time.

Another object of the present invention is to provide a singly balanced modulator which will provide a carrier and sideband output; which will reject fundamental modulating frequencies in the output; which will maintain high precision balance for extended periods of time and wherein the self-balancing function is accomplished without loss of gain for the carrier and sidebands.

Another purpose of the present invention is to provide a balanced modulator which will operate successfully where the modulating signal is to modulate a carrier of relatively low frequency compared to the modulating frequency and wherein the balance structure provided permits cancellation of the modulating frequency in the output.

Another aim of the present invention is to provide a singly balanced modulator adaptable to a carrier of relatively low frequency wherein substantial cancellation of modulating frequency energy in the output will be effected; wherein filtering problems are reduced, and which will be adaptable where the modulating voltage comprises highly complex wideband modulating waveforms.

Another object of the present invention is to provide a modulator to produce an output signal comprising an amplitude modulated carrier, and double sidebands with complete suppression of the modulating waveform.

Another purpose of the present invention is to provide a singly balanced modulator and a feedback loop wherein the relative amplitude and polarity of unbalanced signals in the output is measured to derive a correcting voltage to feed back to the input and wherein the gain of the system for the carrier is not reduced even though a high degree of degeneration exists for the unbalance signal and wherein relatively simple and economical construction and components are used.

Figure 2B:
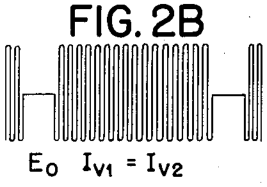
Figure 2C:
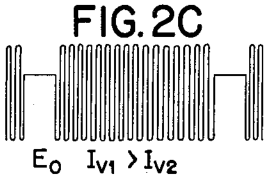
Figure 2D:
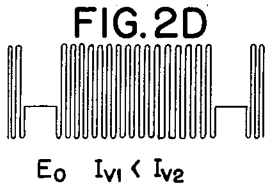
Figure 1:
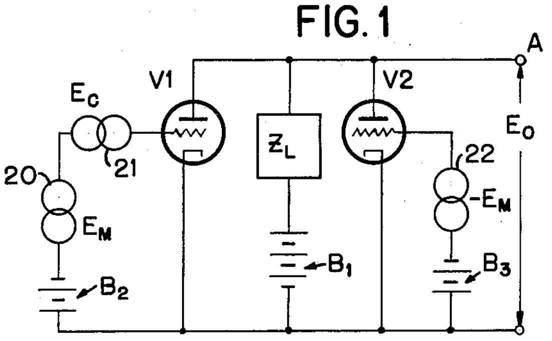
Figure 6:
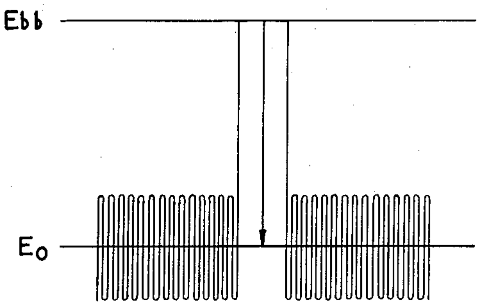
Figure 3:
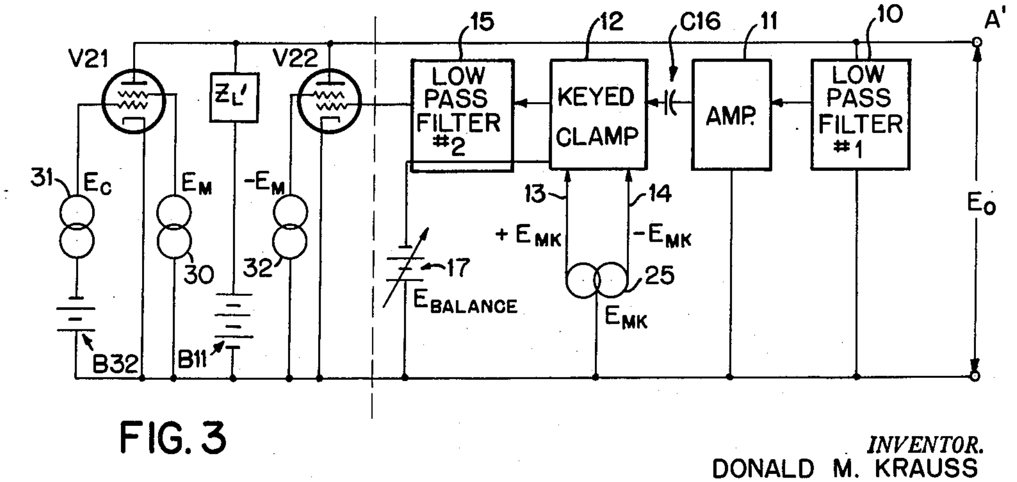
Figure 4A:
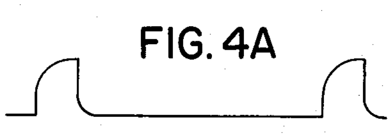
Figures 4B, 4C:
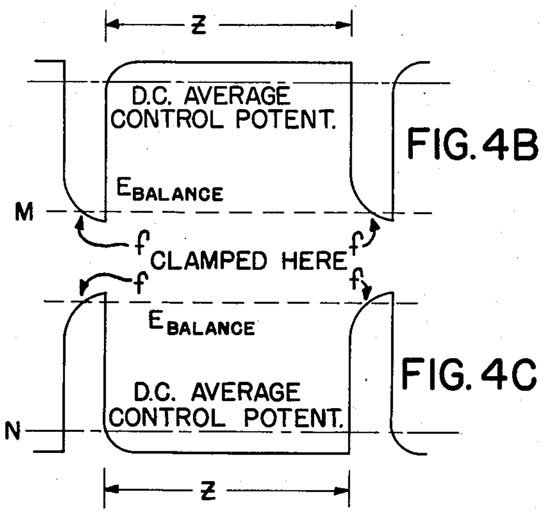
Figure 4D:
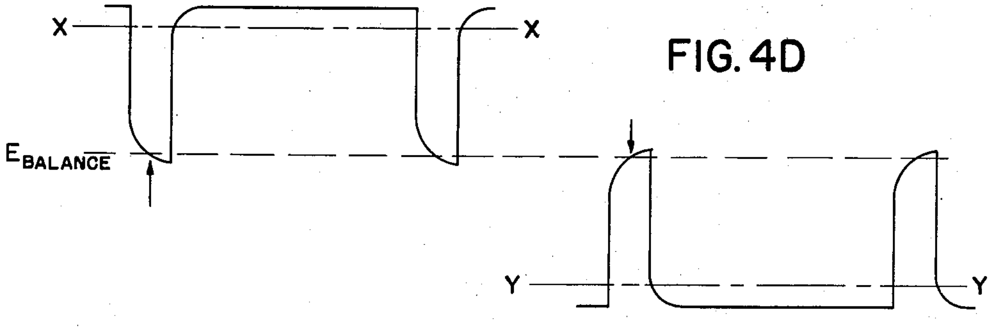
Figure 5A:
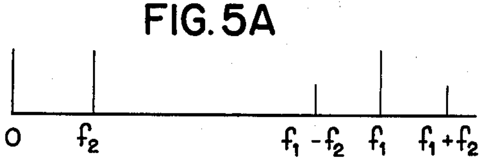
Figure 5B:
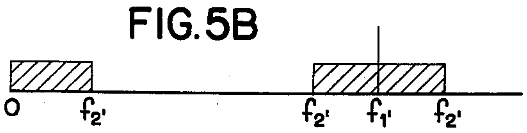
Figure 7:
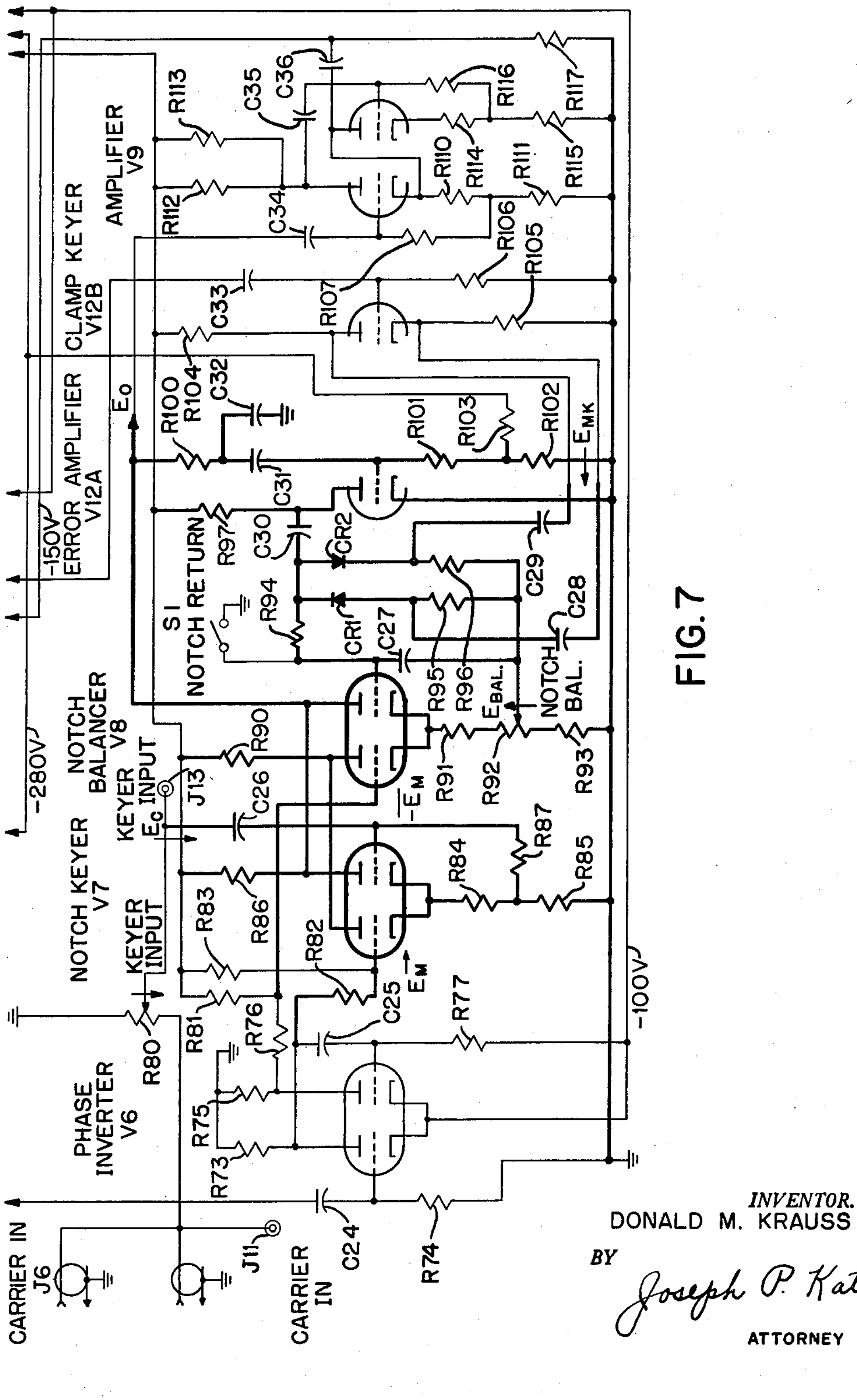

While the novel and distinctive features of the invention are particularly pointed out in the appended claims, a more expository treatment of the invention, in principle and in detail, together with additional objects and advantages thereof is afforded by the following description and accompanying drawing in which:

FIG. 1 is a schematic representation of a singly balanced modulator,

FIG. 2A is a diagrammatic representation of the waveform of synchronizing pulses which may be applied as the modulating voltage on a carrier, FIG. 2B is a diagrammatic representation of ideal modulated carrier waveform output from the circuit of FIG. 1 which would result if the circuit were in perfect balance, FIG. 2C is a diagrammatic representation of the waveform of the modulated carrier output illustrative of the effect of modulating the carrier with the waveform of FIG. 2A when the current in the second stage of the apparatus of FIG. 1 is low during the pulse compared to the average current in the first stage of FIG. 1 between synchronizing pulses, FIG. 2D is a diagrammatic representation illustrative of the modulated carrier waveform output in the reverse condition of current (high) from that of FIG. 2C when the current in the second stage of the apparatus of FIG. 1 is high during the pulse compared to the first stage average current between synch pulses, FIG. 3 is a schematic representation of the modulator and feedback circuit of a preferred illustrative embodiment of the present invention, FIG. 4A is a diagrammatic representation of the waveform at the input to the voltage amplifier of FIG. 3 where the circuit has become unbalanced such that the second stage conducts too lightly during the synchronizing pulse, FIG. 4B is the voltage after clamping referenced to $E_{balance}$ wherein the waveform possesses an average D.C. value which is more positive $E_{balance}$, FIG. 4C is the waveform when unbalance exists in the opposite direction to that shown in FIG. 4B, FIG. 4D is a diagrammatic representation showing clamping action on waveforms as in FIGS. 4B and 4C combined along the reference line to bring out the function of the keying clamp of the invention in establishing direction of D.C. control voltage from the reference keyed clamp voltage by clamping at the tips of the recurring error voltage signals, FIG. 5A is graphical representation of modulation signal and the modulated carrier output when a carrier and a modulating signal are introduced to a modulator and wherein the modulation signal is a single modulating frequency, FIG. 5B is a diagram similar to FIG. 5A except that the modulating signal comprises a band of frequencies of modulation signals, FIG. 6 is a schematic representation of an unwanted modulation signal in the output from a modulator, where the modulation signal is not suppressed, FIG. 7 is a schematic representation of a second preferred embodiment of the inventive modulator showing an operative form useful in a slow scan presentation system.

Now referring to the figures and in particular to the singly balanced modulator of FIG. 1, a pair of electron discharge devices V1 and V2 respectively, are connected in parallel and feed a common load impedance $Z_L$. Stages V1 and V2 are for example, triode vacuum tube stages. Each comprises an anode, a cathode and a control electrode. The cathodes of stages V1 and V2 are grounded (at reference voltage). The anodes of stages V1 and V2 which are joined together in the parallel tube connection are connected at their junction to one end of load $Z_L$. A voltage source B1 is provided to supply power. Voltage source B1 is grounded at its negative end. Its positive end is connected to the load $Z_L$. Disposed between the control electrode of stage V1 and ground is an alternator or other carrier wave source 21 for carrier signal voltage $E_C$. In series with carrier wave source 21 is a second alternator or other modulating signal wave source 20 for modulating signal voltage $E_M$. Disposed between alternator 21 and ground may be a suitable source of class A grid bias B2 which may be grounded on its positive side and may have its negative side tied to modulating signal source 20. Disposed between the control electrode and cathode of the second stage V2 is a third alternator or other source of modulating signal 22 to supply modulating signal voltage, $-E_M$, in opposite phase to the modulating signal applied to the first stage control electrode. In series therewith and disposed between the cathode of stage V2 and alternator 22 is a bias source B3 for class A operation of stage V2. Bias source B3 has its negative terminal connected to alternator 22 and has its positive terminal grounded.

The balance output voltage $E_O$ is taken off the positive terminal which is connected to the joined anodes of stages V1 and V2 and the side of impedance $Z_L$ opposite the positive terminal side of source $B_1$, and ground.

The singly balanced modulator of FIG. 1 thus comprises two modulated class A amplifiers (see Radio Engineering, Terman, 1947, McGraw-Hill Book Co., Inc., 3rd edition, 4th Impression, page 481). Since a singly balanced modulator balances only the modulating waveform (it does not suppress the carrier waveform) it may be used in the present invention to effect desired carrier output (plus sidebands).

In operation the carrier $E_C$ may be applied to the control electrode of one of the two electron discharge devices connected in parallel and feeding the common load impedance $Z_L$. As shown in FIG. 1, carrier $E_C$ is applied to the control electrode of stage V1. The modulating signals $E_M$ and opposite phase $-E_M$ is fed in these opposite phases $E_M$ and $-E_M$ to the respective control electrodes of each of the electron discharge devices V1 and V2. That is, the positive modulating voltage signal may be fed to the control electrode of stage V1 and the negative modulating signal voltage $-E_M$ may be fed to the control electrode of stage V2. Utilizing the non-linear transfer characteristic of the first electron discharge device V1, the gain for the carrier voltage $E_C$ through stage V1 may be varied in accordance with the modulating signal $E_M$ from alternator 20. That is $E_C$ input will be amplified to provide an $E_C$ output in accordance with the modulating voltage used which will fix the point or portion on the non-linear curve of $E_C$ output from a given $E_C$ input at which operation takes place. The modulating signal fed in phase, $E_M$ is applied from alternator 20 to stage V1 and the modulating signal fed in opposite phase, $-E_M$ is applied from alternator 22 to stage V2. If ideal balance in gain (same gain characteristics) of stages V1 and V2 is achieved, the current due to modulating signal voltage $+E_M$ and opposite pulse signal voltage $-E_M$ will cancel and the output $E_O$ will therefore comprise the carrier $E_C$ amplitude modulated by signal voltage $E_M$. That is, the original inputs of modulating voltages $E_M$ and $-E_M$ will cause currents in the output of equal value and opposite polarity so as to cancel each other out and what will be left across the impedance $Z_L$ will be the sum frequency $E_C$ plus $E_M$ and the difference frequency $E_C$ minus $E_M$ and the carrier frequency $E_C$. This is shown in FIG. 5A where the carrier frequency may be represented as $f_1$ and the modulating frequency as $f_2$. Then the lower side frequency will be $f_1-f_2$ and the upper side frequency will be $f_1+f_2$. If $E_M$ has a bandwidth and minus $E_M$ has a bandwidth then the output across load $Z_L$ will comprise the carrier $E_C$ and the sidebands $E_C$ up to plus $E_M$ and $E_C$ up to minus $E_M$. This is shown in FIG. 5B where the carrier frequency is $f_{2'}$ and the modulating frequency is the band from zero to $f_{1'}$. The problem is to pass the carrier and sidebands and reject all modulating frequency components.

If signals at the modulating frequencies $f_2$ (or $f_2'$) are applied to stage V1 without stage V2 being in the circuit, the output would be the two original signals $f_1$, the carrier frequency and $f_2$, the modulating frequency and in addition the output would comprise the difference frequency between the carrier and modulating frequency $f_1-f_2$ and the sum $f_1+f_2$ which is the sum of the carrier and modulating frequency. This is shown in FIG. 5A. As shown in FIG. 5B, if a spread or band of frequencies as from 0 to $f_2'$ is used as a modulating signal or band then the output would include the original band of modulating frequencies from zero to $f_2'$ shown shaded and the carrier frequency $f_1'$ and the lower and upper sidebands respectively spreading from $f_1'-f_2'$ to $f_1'$, inclusive and from $f_1'$ to $f_1'+f_2'$, inclusive. Under such conditions an output would be obtained such as in FIG. 6 with an unwanted modulating waveform. FIG. 6 shows a complicated unwanted waveform comprising a pulse in the output of the modulator. Now if as shown in FIG. 1 the modulating voltage is applied in positive and in inverted phase to stage V1 and V2, respectively and the carrier voltage is applied to only one of these stages; if the stages were completely balanced the output would comprise the carrier wave and sidebands without the modulating voltage. However, in practice it is impossible to cause perfect balance and therefore the undesirable waveform of FIG. 6 results. For this reason the inventive method and means fulfills the requirement for substantially complete cutout of the modulation band of frequencies from zero to $f_2'$ of the modulation frequency $f_2'$. As may be seen in FIGS. 5A and 5B this could be effected by a sharp filter to cut-off all frequencies slightly below $f_1'-f_2'$ or $f_1'-f_2'$ where frequency $f_2$ or $f_2'$ was close to the frequency $f_1-f_2$ or $f_1'-f_2'$ but this would be very costly and difficult and the results would be unsatisfactory to substantially completely remove the unwanted modulation frequency energy. The inventive method contemplates doing this by measuring the amplitude and polarity of the unbalance signal in the output of the stages V1 and V2, deriving a correcting voltage and feeding it back to the input to restore balance in current flow between the two tubes at the modulation frequency.

Now referring to FIGS. 2A, B, C and D assume a circuit such as that of FIG. 1 is used and stage V1 is driven to cutoff by a synchronizing (synch) pulse and stage V2 simultaneously is driven on. FIG. 2A represents a modulation pulse which, for example, may be sent from the sending terminal of a system where it may be necessary to modulate synchronizing pulses at 60 cycles per second repetition rate on a 11.0 kilocycle carrier which has already been modulated by a slow video waveform. For maximum synchronizing voltage to noise voltage ratio, the tips or pulses of the synchronizing pulses may be set at 100% modulation. If ideal balance in the circuit has been achieved upon effecting modulation voltage $+E_M$ and $-E_M$ to stages V1 and V2 along with the carrier as shown in FIG. 1, stages V2 on being driven on when stage V1 was driven to cutoff by the synchronizing pulse conducts such that stage V2 now maintains output voltage $E_O$ at a level identical to the average value of output voltage $E_O$ during the interval between the synchronizing pulses. That is, upon applying the synchronizing voltage of FIG. 2A to the circuit of FIG. 1 in the ideal balance condition the output of FIG. 2B results. That is:

If $$I_{V1}=\text{current through stage V1}$$

And $$I_{V2}=\text{current through stage V2}$$

Then, $$I_{V1}=I_{V2}$$

where the stages conduct current and gain equally as shown by the waveform of FIG. 2.

Any imperfection of balance of current flow through the tubes V1 and V2, however, will introduce a shift of the level during the synchronizing pulse resulting from the addition of the small amount of modulating signal, $E_M$ (or $-E_M$) to the ideal waveform of FIG. 2B. FIG. 2C illustrates the effect when the current in stage V2 during the synchronizing pulses is low compared to the average current in stage V1 between synchronizing pulses. That is, when the current $I_{V1}$ is greater than the current $I_{V2}$ or $I_{V1}>I_{V2}$. The gain effect being low it is the same effect as if a less negative synchronizing pulse had been applied than required to produce a 100% modulation or cut-off of stage V1.

FIG. 2D illustrates the effect of the reverse condition, that is, when the current in stage V1 during the sync pulse is low compared to the average current in stage V2 between the synchronizing pulses. That is when $I_{V1}<I_{V2}$ we get an unwanted negative modulating signal in the output at synchronizing periods.

Current unbalances between stages V1 and V2 of less than one part in 500 may be sufficient to cause difficulty in synchronizing recovery circuits at the receiving terminal of the above example system. Unbalances greater than this may normally be expected due to normal aging defects of circuit components, and particularly the vacuum tube stages V1 and V2. In the case of sinusoidal wave modulation some form of self-regulation may occur. However, where complex non-sinusoidal modulating waveforms are employed applicant's apparatus as shown in FIG. 3 is especially required to solve the problem.

Referring to the illustrative embodiment of the inventive method and means of FIG. 3, with the circuit shown measuring the relative amplitude and polarity of the unbalanced signal in the output, deriving a correcting voltage therefrom, and feeding back that voltage to the input is effected. Negative feedback means are utilized.

In FIG. 3, the portion shown to the left of the dashed lines could be made identical to the circuit of FIG. 1 or could be as shown, however, structurally and operationally it is relatively interchangeable with the FIG. 1 device.

As shown to the left of the embodiment of FIG. 3, stages V21 and V22 are disposed in parallel and have their anodes and cathodes tied together. Disposed between the connected anodes of stages V21 and V22 and their connected cathodes which are at reference ground potential are the output load $Z_L'$ and a source of positive power or voltage for the tube operation, B11. Source B11 has its negative terminal grounded and its positive terminal connected to $Z_L'$. Carrier signals $E_C$ may be applied by means of source 31 to the control electrode of stage V21. Class A bias for the control electrode is provided by bias source B32 disposed between source of carrier voltage signals 31 and ground. Stages V21 and V22 are tetrodes and each comprises a screen (2nd control electrode here) and a control electrode (first control electrode) in addition to its anode and cathode. In practice as shown in FIG. 8, duo triodes may be used for each of stages V21 and V22 and the control electrodes of each of the pair may be control electrodes 1 and 2, respectively. Disposed between the screen electrode or the second electrode of stage V21 and ground is a source 30 of modulating voltage $E_M$. Disposed between the screen electrode or second electrode of stage V22 and ground is a source 32 of negative or inverse phase modulating voltage $-E_M$. That is the phase of source 32 modulating voltage $-E_M$ is inverse or opposite compared to the modulating voltage $E_M$ of source 30. Thus, applied to the screen grid or second grid of stage V21 will be the signal voltage $E_M$ and applied to the first or control grid of stage V21 will be the carrier voltage $E_C$ and applied to the second electrode or screen electrode of stage V22 may be the opposite phase modulating voltage $-E_M$.

The output signal $E_O$ (as in FIG. 1, stages V1 and V2) is taken between the anode of stages V21 and V22 which have been connected together and ground. Disposed thereacross that is between the output terminal A' of FIG. 3 and ground is a first low pass filter 10. Responsive to the output of low pass filter 10 and connected in parallel therewith is an amplifier 11. Amplifier 11 is capacitively or otherwise A.-C. coupled at its output to keyed clamp 12. Keyed clamp 12 is a bidirectional clamp fed by (1) in phase and (2) 180° out of phase, voltage signals $E_{MK}$ from modulating voltage source 25. Voltage signals $E_{MK}$ are derived from the synchronizing pulse or other modulation waveform $E_M$ and are in synchronism therewith. From source 25, the keying voltage signals $E_{MK}$ are fed to the keying clamp 12 over two clamp input lines 13 and 14, line 13 feeding plus $E_M$ and line 14 feeding minus $E_M$ derived signals. Responsive to keyed clamp 12 is a second low pass filter 15 which is disposed between the output of keyed clamp 12 and the control electrode of stage V2. A variable bias supply voltage labeled $E_{balance}$ is disposed between low pass filter No. 2 and ground and provide reference D.-C. control potential for the clamp to which the negative side of source 17 (opposite its grounded end) is connected through the filter 15.

The circuit operates as follows:

The carrier $E_C$ is applied to the control electrode of stage V21. The modulating signal $E_M$ is fed in phase to the screen electrode of stage V21. The modulating signal is fed in opposite phase $-E_M$ with the modulating signal fed to the screen grid of stage V21; to the screen grid of stage V22.

The output signal $E_O$ is passed through the first low pass filter 10 which reduces the relative amplitude of the carrier and sidebands with respect to the unbalanced signal, the unbalanced signal being on the low or passing side and the carrier and sidebands being on the rejection or high side.

The unbalanced signal represents original modulation frequency which appears in the output in unbalance condition and which is undesired. The unbalanced signal is then fed through voltage amplifier 11 and A.-C. coupled through capacitor C16 to bi-directional keyed clamp 12. Keyed clamp 12 is keyed in synchronism with the synchronizing pulse waveform $E_M$ by the signal derived from $E_M$ and designated as $E_{MK}$. The derived synchronizing voltage derived from the FIG. 2A synchronizing voltage, for example, could be the leading or trailing edge of the sync pulse. The keyed clamp 12 is followed by second low pass filter 15. Filter 15 smooths out the waveform of the keyed clamp 12 output to deliver a D.-C. control voltage to the control electrode of stage V22. This D.-C. control voltage is referenced through the low pass filter 15 to a variable bias supply potential 17 (supply voltage) $E_{balance}$. It is this D.-C. control voltage supplied to the control electrode of stage V22 which changes conduction through stage V22 to balance with stage V21 current and increase the modulation voltage signal from the output.

For stages V21 and V22 shown as dual-control discharge devices for simplicity, (tetrodes) other well known forms of non-linear amplification devices which permit simultaneous control by two or more variables for control devices may be used.

In operation, assume the circuit has become unbalanced because stage V22 conducts too lightly during the synchronizing pulse. The waveform at the output $E_O$ will be in the nature of that shown in FIG. 2C. The first low pass filter 10 will remove the carrier and sidebands leaving a waveform such as shown in FIG. 4A at the input to the voltage amplifier 11. The output of amplifier 11 (assuming a single or odd number of amplifier stages) will appear amplified and inverted. After clamping by keyed clamp 12 the waveform will be referenced to $E_{balance}$ as shown in FIG. 4B to possess an average D.-C. value which is more positive than $E_{balance}$. After smoothing this average D.-C. control potential to provide a steady D.-C. output from low pass filter 15, the smoothed control voltage D.-C. is fed to the first control electrode of stage V22 as an addition to the $E_{balance}$ voltage, set by D.-C. source 17. This change in D.-C. voltage at the control electrode of stage V22 to a more positive direction raises the conduction level of stage V22 during synchronizing pulses and thereby reduces the unbalance between the conduction of current of stages V22 relative to stage V21 to cause the now more nearly equal and opposite currents due to the modulation voltage applied to more nearly or totally cancel each other in the output leaving an output consisting of carrier and sum and difference frequencies only.

When unbalance exists in the opposite direction, that is when stage V21 is conducting too lightly the waveform at the output of clamp 12 will be inverted as shown in FIG. 4C and a D.-C. voltage will be produced in the direction of lowering of the control electrode voltage to thereby reduce the current conduction of stage V22 during synchronizing pulses to equal the conduction of stage V21.

The use of the clamp is an important part of the present invention and will be explained in greater detail hereinbelow:

The unique use of the clamp to determine the direction of unbalance requires that the modulating signal, $E_M$, contain a reference level which is regularly recurring. While the invention is not limited thereto, video and synchronizing waveforms generated in connection with scanning processes as in television, generally fulfill this requirement.

The signal representing undesired modulation passes the low pass filter and the modulated carrier and its sidebands are rejected. After amplification and inversion the keyed clamp 12 clamps the tips or peaks of the amplified recurring error signal. The keyed clamp 12, for example, may be of the type shown in Fundamentals of Television Engineering by Glenn M. Glassford, McGraw-Hill Book Co. on page 328 in the basic circuit of FIG. 10–42(a).

As may be seen in FIGS. 4B, 4C and 4D the average control potential will be above or below $E_{balance}$ in accordance with the major portion of the area from the reference tip which is at $E_{balance}$. Thus noting that the major portion of the area above $E_{balance}$ in the case of the left hand waveform of FIG. 4D is above the balance voltage potential, the D.-C. level set by these recurring waveforms representing error is above the $E_{balance}$ voltage and when filtered to a smooth D.-C. will appear at the control electrode of stage V22 as a D.-C. of that magnitude. Similarly the right hand side of FIG. 4D shows that where constantly recurring intervals of the error voltage occur and are clamped at the tips of the peaks of this error voltage where the majority of the time interval between pulses is below $E_{balance}$ the dash dot lines *yy* as compared with the lines *xx* on the left hand side of the figure represent an opposite direction average D.-C. potential for control purposes. Following the keyed clamp 12 the low pass filter 15 smooths out this error correction voltage and stage V22 will become more or less conductive in accordance with that control voltage to restore the circuit of stages V21 and V22 to balance such that the input modulating voltages $E_M$ and $-E_M$ will cause currents which will be equal and opposite to substantially completely cancel each other. Thus the clamp and adjustable reference for $E_{balance}$ provides a quick-acting effective means of insuring highly effective balance and elimination of input modulation voltage components from the output.

The degenerative or negative feedback from the connected anodes of stages V21 and V22 is applied through the feedback loop or servo loop comprising filter 10, amplifier 11, clamp 12 and filter 15 and to control electrode of stage V22. Stage V22 has no carrier applied but has only opposite or inverted phase modulation voltage $-E_M$ applied to its screen grid. This results in the advantage that the gain of the system for the carrier is not reduced even with the high degree of degenerative feedback when there is an unbalanced signal. That is, the signal path into the control electrode of stage V22 causes that stage to conduct more or less heavily depending upon the D.-C. level applied to the control electrode of stage V22. Therefore only modulating signal voltage (not the carrier $E_C$) is amplified or not amplified in accordance therewith to oppose the positive $E_M$ or modulating voltage applied to the screen grid of stage V21. The carrier is normally amplified by class A amplifier stage V21 regardless of unbalance since its amplification is not affected by degenerative feedback to stage V22. Thus the carrier gain through stage V21 is constant whether the inverse modulation signal is attenuated or increased with relation to the positive phase modulating signal so as to cancel these against each other leaving the carrier and sidebands or side signals.

Again referring to FIGS. 4B, 4C and 4D the current waveform which is the error signal portion of $E_O$, amplified, inverted and coupled through capacitor C16 is acted on by the keyed clamp 12 to set or clamp the particular portion of that current waveform, that is, the voltage of the waveform at a particular instant of time (chosen to be at the tip or peak of the waveform due to keying at the derived voltage $E_{MK}$ synchronized rate) at a D.-C. level of that waveform corresponding to the instantaneous voltage of the waveform at that time. The clamped keying waveform $E_{MK}$ which may be derived from modulation waveform $E_M$ ($-E_{MK}$ may be derived from $-E_M$ and $+E_{MK}$ may be derived from $+E_M$) is keyed in synchronism with the sync pulse or other synchronizing waveform $E_M$ and simultaneously the error waveform fed into the clamp 12 through capacitor C16 is derived from the output modulation voltage $E_M$ portion passing through the low pass filter 10 which portion is in synchronism because it is the modulating current output due to unbalance between stages V21 and V22 at the modulating frequency $E_M$. This fixes the exact instant at which clamping is effected. That is, the keyed clamp circuit 12 sets a particular time in a recurrent waveform to a particular D.-C. level at whatever the waveform happens to be at that time. This is apparent from the points *f* of FIGS. 4B and 4C wherein clamping is effected at the time of waveform point *f* to give an $E_{balance}$ or reference voltage at whatever the tip of the waveform is at that particular time. This occurs along the flat (or peak) of the recurring waveform to set the $E_{balance}$ D.-C. voltage at that level regardless of what that level is. Therefore, an output from the keyed clamp results which is proportional to the magnitude and direction of circuit output modulating waveform amplitude clamped at a particular time and referenced to the arbitrarily chosen $E_{balance}$ voltage. The average voltage will therefore be somewhat above or below $E_{balance}$ in accordance with the duty cycle. For example, as shown in FIG. 4B, the duty cycle across Z (the bottom of the waveform of FIG. 4A as amplified and inverted) will average well above $E_{balance}$ as shown in FIG. 4B and therefore the average will be near the top of that waveform. In FIG. 4C similarly the D.-C. average control potential will be considerably below the D.-C. reference at which clamping has been effected. The D.-C. level plus or minus relative to the clamping voltage is determined by the amount of unbalance between the characteristics of tubes V21 and V22 at the modulating voltage frequency. Since the tip of the recurring waveform representing error is at the $E_{balance}$ voltage, the key clamp by providing deviation therefrom, gives the direction of unbalance of the signal across the load $Z_L$. This error signal represents the unwanted modulation of the two tubes in parallel.

In the inventive embodiment of FIG. 3 the filters used may be very simple. R-C (resistance-capacitance) integrators may be sufficient for most purposes. Without the invention, where unwanted components on the modulation signals appear in the modulator output, the means of employing filters to reject unwanted frequencies and pass wanted frequencies would require complicated and expensive sharp cut-off filters where closeness in frequency between the upper limits of the modulating frequency and the lower limits of the lower sideband modulated carrier wave occur.

In contrast to the above-described operation at 100% modulation, where less than 100% modulation is used it will be understood that operation is substantially identical except that stage V1 (FIG. 1) is never cut off and stage V2 (FIG. 1) is required to supply a current equal to the difference between the instantaneous operating current in stage V1 and the average current in stage V1 during peak carrier current flow. Low pass filter 10 must reduce the residual carrier sufficiently to permit proper clamping of this unbalance signal. In the FIG. 3 embodiment stages V21 and V22 will correspond to stages V1 and V2 in this description.

While the invention is not to be construed as limited thereto referring to FIG. 7 there is shown a successful embodiment of the invention. The following table of values may be used in the embodiment of FIG. 7 by way of example:

| Part: | Value or designation |
|---|---|
| V6 | 5814 or 5963 |
| V7 | 6J6 |
| V8 | 6J6 |
| V12A and B | 6829 |
| V9 | 5687 |
| Resistor: | |
| R73 | 10K |
| R74 | 10 Meg. |
| R75 | 10K |
| R77 | 10K |
| R80 | 10K |
| R81 | 270K |
| R82 | 33K |
| R83 | 270K |
| R84 | 2.2K |
| R85 | 2.2K |
| R86 | 2.2K |
| R87 | 1 Meg. |
| R90 | 13K |
| R91 | 1.2K |
| R92 | 1K |
| R93 | 2.2K |
| R94 | 4.7 Meg. |
| R95 | 100K |
| R96 | 100K |
| R97 | 51K |
| R100 | 75K |
| R101 | 1 Meg. |
| R102 | 2K |
| R103 | 270K |
| R104 | 1K |
| R105 | 1K |
| R106 | 1 Meg. |
| R107 | 390K |
| R110 | 2K |
| R111 | 100K |
| R112 | 3600 |
| R113 | 3600 |
| R114 | 68 |
| R115 | 180 |
| R116 | 1 Meg. |
| R117 | 10K |
| R76 | 36K |
| Capacitor: | |
| C24 | .47 |
| C25 | 1.00 |
| C26 | 1.00 |
| C27 | 2.00 |
| C28 | .47 |
| C29 | .47 |
| C30 | .47 |
| C31 | 0.10 |
| C32 | .47 |
| C33 | .01 |
| C34 | .01 |
| C35 | .01 |
| C36 | 125 |

Legend:
K=1,000
Meg.=1,000,000
Resistor values in ohms.
Capacitor values in microfarads.

Referring further to FIG. 7 the apparatus of this embodiment comprises a pair of duo triodes V7 and V8 wherein stage V7 corresponds functionally to stage V21 of FIG. 3, stage V8 corresponds to stage V22 of FIG. 3, stage V12A corresponds to the amplifier 11 of FIG. 3, the first low pass filter corresponding to filter 10 comprises resistor R100 and capacitor C32, the clamp corresponding to clamp 12 comprises diodes CR1 and CR2 and resistors R95 and R96 and the second low pass filter corresponding to filter 15 comprises resistor R94 and capacitor C27. This embodiment may be contrasted with that of FIGS. 1 and 3 as follows: In the FIG. 1 embodiment both carrier and modulation are fed to the control grid of one stage and the inverse modulation fed to the other stage. In the FIG. 3 embodiment each stage has two control electrodes or grids in effect and the carrier and modulation are fed to separate grids of one stage, with the inverse modulation being fed to one grid of the other stage. In the FIG. 7 device each stage comprises a duo-triode so that the modulating signal and carrier may be fed to separate triode grids in one stage and the inverse modulation fed to the grid of one of the triodes of the second stage.

The above-described invention thus provides a singly balanced modulator which has the feature of a high degree of rejection of fundamental modulating frequency or frequencies in the output while passing through the carrier frequency plus side-band or side frequencies and which will maintain a high precision balance for extended periods of time. The inventive circuit performs this in the presence of highly complex nonsinusoidal modulating waveforms and without loss of gain to the carrier and sidebands. The singly balanced modulator of the invention thereby provides an ideal output signal comprising an amplitude modulated carrier and double sidebands with substantially complete suppression (or cancellation) of the modulating waveform. This is effected by measuring the relative amplitude and polarity of the unbalance signal in the output of the modulator to derive a correcting voltage, feeding back this correcting voltage to the input by delivering the recurring error signal which recurs at the modulation signal rate and clamping in synchronism with the modulation signal to determine the direction of unbalance; the amplitude of error signal having determined the amount of unbalance.

While a specific embodiment of the invention has been shown and described, it should be recognized that the invention should not be limited thereto. It is accordingly intended in the appended claims to claim all such variations as fall within the true spirit of the invention.

What is claimed is:

1. A modulator for modulating a carrier with a waveform having a recurrent reference level therein and adapted to provide carrier and sideband output with a high degree of rejection of fundamental modulating frequencies, said modulator comprising a singly balanced modulator circuit, means responsive to modulation frequency energy in the modulator output sensing said recurrent level to derive a recurring signal waveform the relative amplitude and polarity of which waveform indicates the amount and direction respectively of the unbalance in the output of said modulator, means to derive a correcting D.-C. voltage in accordance with said recurring waveform, means to feed back said correcting voltage to said modulator thereby causing shift in gain to cause balanced output of said modulator to substantially eliminate fundamental modulating frequencies in the output.

2. The apparatus of claim 1 wherein said means responsive to modulation frequency energy in the modulator output to provide a recurring signal waveform comprises a low pass filter to pass through modulation frequency energy and to reject frequencies within the range of the carrier and the sum and difference frequencies of the carrier and the modulating signal.

3. The apparatus of claim 2 wherein said means to derive a correcting D.-C. voltage in accordance with said recurring waveform comprises a keyed clamp circuit keyed in synchronism with said modulating signals to clamp the tips of the recurring waveforms to a reference voltage to thereby provide a D.-C. voltage with respect to the tips of said recurring waveform of magnitude and direction in accordance with said unbalance signal output.

4. The apparatus of claim 3 wherein said keyed clamp circuit comprises a keyed clamp stage, means to provide signals synchronous with and derived from said modulating voltage and a source of D.-C. balance voltage to thereby cause the peaks of said recurring waveform to be clamped to the D.-C. balance level predetermined by said source of balance voltage.

5. The apparatus of claim 4 wherein said source of balance voltage is adjustable and including filter means to convert the D.-C. average control potential difference due to deviation of the recurring waveform from the balance voltage to a smooth direct current potential suitable for application to said modulator, and means to apply said smoothed control voltage to the modulator to effect balance of the modulator stages.

6. The apparatus of claim 5 wherein said modulator comprises a first and a second amplifier, each of said amplifiers comprising amplifier control electrode means, means to supply carrier and modulation voltage signals to said first amplifier and means to supply modulation signals to the second amplifier, the modulation voltage signals supplied to said second amplifier being in opposite phase to those supplied to said first amplifier.

7. A singly balanced modulator to provide carrier and sideband output with a high degree of rejection of fundamental modulating frequencies, said modulator comprising a first and a second amplifier, means to apply modulation signals in opposite phase to said amplifiers, means to apply carrier signals to said first amplifier, a common load responsive to said first and said second amplifiers to develop output thereacross, unbalance in gain characteristics of said amplifiers causing currents at modulation frequency to appear across said load, means to reject said carrier frequency and sum and difference frequencies of said carrier and modulation frequencies output while passing said modulation frequency error output, keyed clamp means to clamp said modulation output signals at the tips of the signal waves, to thereby provide a control voltage of amplitude corresponding to the amplitude of said modulating signals and of direction in accordance with the unbalance which causes modulation frequency output, said control voltage being applied to the second amplifier to thereby provide bias in a direction to restore equality of gain between said first and second amplifiers.

8. Means for providing an amplitude modulated carrier and double sidebands with substantially complete suppression of the modulating waveform, said means comprising a balanced modulator, said balanced modulator comprising a first and a second non-linear electron discharge device, means to control amplification of input to each of said devices, a common output load for developing output from each of said discharge devices, means to introduce a carrier frequency voltage signal to the amplification control means of one of said discharge devices, means to introduce modulated voltage to the control means of said device to which carrier voltage is introduced, and means to introduce modulation voltage opposite in phase to the modulation applied to said first electron discharge device to the control means of said second discharge device, means responsive to pass the unbalanced output modulation frequency signal voltage representing unequal current gain characteristics of the two discharge devices and to reject carrier and sideband frequency voltage, a source of reference clamping voltage, clamp means responsive to said unbalance signal passing means and referenced to said source of reference clamping voltage to derive a correcting voltage in accordance with the direction of the unbalance, and means to feed back a function of said derived voltage to the control means of one of the electron discharge devices of said modulator to thereby restore balance in the output to substantially suppress output modulator wave frequency energy.

9. The apparatus of claim 7 wherein said negative feedback voltage representing unbalance of the circuit is fed back to the control means of said second stage and including a source of keying pulses derived from said modulating signal, said keying clamp being responsive to said keying pulses to clamp said passed modulation voltage to said reference voltage in synchronism with said keying pulses and wherein said modulating signals comprise complex non-sinusoidal wave signals.

10. Apparatus for providing an amplitude modulated carrier and double sideband output from an input comprising a modulating waveform and a carrier with substantially complete suppression of the modulating waveform in the output, said apparatus comprising means for modulating a carrier with modulation signals to provide modulated carrier output comprising the carrier, the carrier plus the modulating signal and the carrier minus the modulating frequency signal, means for amplifying the modulating voltage separately in inverse phase by an amplification amount to substantially cancel said modulation signal, means for combining the carrier and modulation and inverse modulation outputs, means for separating out an error signal from said outputs to provide an error signal of amplitude and polarity corresponding to the unbalance signal in the output representing undesired modulating voltage which has not been cancelled by opposition amplifying of the modulation voltage, means for deriving a correcting voltage in accordance with magnitude and direction of said separated output signal; said deriving means comprising means for (1) amplifying and inverting the error signal, (2) introducing a predetermined reference voltage for clamping of said unwanted frequency voltage, and (3) clamping the positive peaks of said amplified and inverted error signal to said predetermined reference voltage so as to convert said undesired balance signal energy to a direct current voltage, to thereby provide an output D.-C. voltage representing unbalance; and means for feeding back said last-named D.-C. voltage in synchronism with said input negative phase modulating signal voltage to thereby cause amplification of the modulating voltage in an amount to cause balance with the amplification of said first stage.

11. Means to provide an amplitude modulated carrier and double sidebands with substantially complete suppression of the modulating waveform, said means comprising a singly balanced modulator, said balanced modulator comprising a first and a second electron discharge device, each of said discharge devices having non-linear characteristics such that the gain of a carrier voltage applied to said devices may be varied in accordance with a modulating voltage applied to said devices, means to apply a carrier voltage signal to said first device, means to apply a modulating signal to said first and second devices, the modulating signal being applied in a first modulating phase to said first device and in an opposite phase to said first modulating signal phase to said second device, said modulating signal comprising a complex non-sinuosidal waveform signal, a common output load responsive to amplified output of said first and second electron discharge devices, filter means responsive to said output to pass signals of recurring form at modulation frequency representing unbalance in the two amplification stages and to reject the carrier and sidebands output, means to amplify said filtered signals, and clamp means to clamp the tips of said recurring peaks of said amplified waveform, means to provide a predetermined voltage to which said clamping of said peaks is effected, said clamping means providing a D.-C. voltage representing the direction and magnitude of said signals passing said filter, means to smooth said clamped voltage and means to apply said smoothed voltage to control the gain of said second discharge device to thereby cause balance with respect to the modulating signals between said devices to eliminate modulation voltage components from appearing in the output.

References Cited in the file of this patent

UNITED STATES PATENTS

| | | |
|---|---|---|
| 2,185,874 | Urtel | Jan. 2, 1940 |
| 2,204,058 | Urtel | June 11, 1940 |
| 2,858,511 | Chauvin et al. | Oct. 28, 1958 |